United States Patent [19]

Nakamura

[11] Patent Number: 5,359,467
[45] Date of Patent: Oct. 25, 1994

[54] WRITE CIRCUIT PROVIDING SELECTIVE WAVEFORM CORRECTION BASED ON RECORDING DENSITY, AND MAGNETIC RECORDING APPARATUS EMPLOYING THE WRITE CIRCUIT

[75] Inventor: Akira Nakamura, Kyoto, Japan

[73] Assignee: Rohm Co., Ltd., Kyoto, Japan

[21] Appl. No.: 27,796

[22] Filed: Mar. 8, 1993

[30] Foreign Application Priority Data

Mar. 6, 1992 [JP] Japan ............... 4-084449

[51] Int. Cl.⁵ .................. G11B 5/09; G11B 15/12
[52] U.S. Cl. ....................... 360/46; 360/61
[58] Field of Search ............ 360/46, 48, 59, 63, 360/51, 61, 65, 45, 67, 68; 369/59

[56] References Cited

U.S. PATENT DOCUMENTS

| | | | |
|---|---|---|---|
| 4,467,374 | 8/1984 | Batey et al. | 360/46 |
| 4,780,771 | 10/1988 | Miyazaki et al. | 360/48 |
| 4,803,571 | 2/1989 | Fujioka et al. | 360/63 |
| 4,809,088 | 2/1989 | Lofgren et al. | 360/31 |
| 4,866,692 | 9/1989 | Saito et al. | 369/59 |
| 5,161,071 | 11/1992 | Nakamura | 360/46 |
| 5,216,553 | 6/1993 | Nakamura | 360/46 |

*Primary Examiner*—John Shepperd
*Assistant Examiner*—Patrick Wamsley
*Attorney, Agent, or Firm*—Fay, Sharpe, Beall, Fagan, Minnich & McKee

[57] ABSTRACT

A write circuit includes a waveform correction circuit for changing a waveform of leading and trailing portions of a write current so that a read circuit of the magnetic recording apparatus for magnetically recording at a recording density lower than the predetermined recording density can read the recorded signal. The waveform correction circuit is inserted between a coil of a magnetic head of the magnetic recording apparatus and a binary signal generator circuit when it receives a selection signal for selecting a recording state corresponding to the magnetic recording apparatus with the low recording density.

7 Claims, 3 Drawing Sheets

WRITE CIRCUIT PROVIDING SELECTIVE WAVEFORM CORRECTION BASED ON RECORDING DENSITY, AND MAGNETIC RECORDING APPARATUS EMPLOYING THE WRITE CIRCUIT

BACKGROUND OF THE INVENTION

The present invention relates to a write circuit and a magnetic storage device using the same and, particularly, to a write circuit for use in a magnetic storage device such as a flexible disc drive device (FDD) or a hard disc drive device (HDD) which is capable of being written at different recording densities.

Although a current FDD, which is an external memory, usually can store information at a density of about 1 M bytes per magnetic recording medium, an FDD capable of being written at a density of about 2 M byte or about 4 M bytes per magnetic recording medium has been developed and is commercially available. The disc drive device capable of recording at about 1 M byte per medium will be referred to as a "1 mega byte device" and that capable of recording at about 4 M bytes per medium will be referred to as a "4 mega byte device", hereinafter.

FIG. 5 shows a conventional write/read circuit for a 4 mega byte device storing information at a density of about 4 M bytes per recording medium and FIG. 6 shows signal waveforms at various portions thereof for explaining a circuit operation. In FIG. 6, the waveforms are identified with letters that also used for circuit portions in FIG. 5 to clarify correspondence therebetween.

In FIG. 5, a write circuit 20 is constituted with a flip-flop 21, drivers 22 and 23 and a coil 24 of a read/write magnetic head, all of which are connected in the described sequence. A read circuit 30 is constituted with the coil 24 of the magnetic head, an amplifier 25, a filter circuit 26, a differentiator 27, a zero volt comparator 28 and a pulse shaper circuit 29, all of which are connected in the described sequence.

In the write circuit 20, a write signal A (see waveform A in FIG. 6) which is a pulse signal containing data bits or a combination of clock and data bits is supplied to a trigger input T of the flip-flop 21. The flip-flop 21 changes its state upon every reception of the write signal A. A signal B which is a Q output of the flip-flop 21 is thus changed in its state in accordance timing of the signal A (see waveform B in FIG. 6). The driver 22 produces a write current in one of a supplying or sinking direction in synchronism with the state of the signal B. The driver 23 is responsive to a $\overline{Q}$ output of the flip-flop 21 to produce a current whose direction is opposite to the direction of the write current C.

As a result, the write current C whose direction is switched according to the write signal A, flows through the coil 24 (see waveform C in FIG. 6), upon which a magnetic medium (not shown) is magnetized in a direction determined by the direction of the write current C through a magnetic head (not shown) on which the coil 24 is wound (see magnetizing waveform D in FIG. 6).

In this case, the flip-flop 21 serves as a binary signals generator for generating binary signal "1" and "0" corresponding to the write signal A, as shown by the waveform B in FIG. 6.

The read circuit 30 detects the magnetized state of the magnetic medium to which data are written by the write circuit 20 an electro-motive force generated in the coil 24 of the magnetic head. The electro-motive force detected is amplified by the amplifier 25 and supplied to the filter circuit 26 as a read signal to obtain a read signal E corresponding to a changing rate of magnetization D (see waveform E in FIG. 6). The signal E is differentiated by the differentiator 27. A resultant signal F crosses zero points at extremes of the signal E (see waveform F in FIG. 6). Then, the signal F is binarized by the zero volt comparator 28 according to positive and negative values of its waveform. As a result, a signal G which is inverted at every extreme of the magnetization D is obtained (see waveform G in FIG. 6). The pulse shaper circuit 29 produces pulses when the signal G inverts. Thus, the write signal A is reproduced as a read signal H (see waveform H in FIG. 6). The reason why the read signal H is the reproduction of the write signal A is that the direction of magnetization D is quickly changed at each reception of a write signal pulse A and the timing is detected as extremes of the magnetization D.

The above discussion applies, in principle, to FDDs regardless of their information recording density, whether 1 M byte per medium or 4 M byte per medium. However, since the recording density of the 4 mega byte device is 4 times that of the 1 mega byte device, a magnetic head and an associated coil 24 thereof are required to be electrically operable a correspondingly higher speed. Further, in order to make the 4 mega byte device compatible with the 1 mega byte device, the 4 mega byte device is made operable to read data written on a medium by the 1 mega byte device. To this end, the filter circuit 26 has a plurality of different filtering characteristics for the 1 mega byte device, a 2 mega byte device and the 4 mega byte device, which can be switched by a selection signal K, so that the 4 mega byte device can read information recorded on the medium by any of the FDDs.

The selection signal K is usually generated by detecting identification holes formed in each medium by means of the detection circuit 10.

Thus, the 4 mega byte device can have the highest level compatibility with other devices. However, a lower level compatibility of it is not always provided. That is, the 4 mega byte device can not always record information on a medium to be used in the 1 mega byte device for reading by the 1 mega byte device. This is because the 1 mega byte device which had been developed earlier and has been used widely does not have any means for providing compatibility with the 4 mega byte device which was developed later.

When a 4 mega byte device writes data on a certain medium recording density corresponding to a 1 mega byte device and the data are read by the 1 mega byte device, there is a problem which will be described with reference to FIG. 3.

Waveforms A, B and C in FIG. 3, which are obtained when the above mentioned writing of data is performed by using the circuit shown in FIG. 5, are the same as those shown in FIG. 6 except that the frequency of inversion becomes lower. However, due to the lower inversion frequency, the magnetization waveform D becomes wider as shown in FIG. 3.

Due to the wider magnetization waveform D, the inversion of magnetization becomes very sharp when data are read by the 1 mega byte device as shown by waveform E in FIG. 3. This is mainly due to a difference in characteristics of a magnetic head between the 1 mega byte device and the 4 mega byte device.

There is no such sharp inversion of magnetization when data writing is performed by a magnetic head used in an existing 1 mega byte device. When such a signal as waveform E shown in FIG. 3 is generated as a read signal in the 1 mega byte device and differentiated therein, a resultant signal F is nearly zero volts in areas Fa and Fb in which magnetization D is stable. Therefore, a signal G from the zero volt comparator 28 includes noise in these areas, causing a normal read to be impossible.

The relation between the 1 mega byte device and other devices having lower recording densities is different from the relation between the 4 mega byte device and the 1 mega byte device and the recording capacity is increased mainly by increasing the number of tracks. The compatibility therebetween is mainly in a format of medium and has substantially no such problem as mentioned above.

The waveforms in FIG. 3 are more or less exaggarated to clarify the relation between the 1 mega byte device and the 4 mega byte device. In a case where data recorded by the 4 mega byte device at a recording density corresponding to that of a 1 mega byte device are read by the 1 mega byte device, the data may be correctly read by retry or error detection such as a CRC check if the waveform of the data has a light pulse form as compared with the waveform E in FIG. 3. However, this does not guarantee that data which are recorded at a recording density corresponding to the 1 mega byte device by the 4 mega byte device are read by the 1 mega byte device.

SUMMARY OF THE INVENTION

An object of the present invention is to provide a write circuit for a magnetic recording apparatus which is compatible with an existing magnetic recording apparatus and which has a higher recording density compared with the existing apparatus.

Another object of the present invention is to provide a magnetic recording apparatus which is compatible with an existing magnetic recording apparatus and which has a higher recording density compared with the existing apparatus.

In order to achieve the objects, according to the present invention, a write circuit of a magnetic recording apparatus, in which a write current flowing through a coil of a magnetic head is switched according to a write signal to magnetize a magnetic recording medium at a predetermined recording density to thereby record information, is characterized by comprising a waveform correction circuit for changing a waveform of leading and trailing portions of the write current so that a read circuit of the magnetic recording apparatus for magnetically recording data at a recording density lower than the predetermined recording density can read the data, the waveform correction circuit being inserted into the overall circuit when the waveform correction circuit receives a selection signal for selecting the recording state corresponding to the magnetic recording apparatus recording information at the lower recording density.

In the write circuit having the construction mentioned above, it is possible to write information at the recording density of, for example, a 4 mega byte device by switching the direction of the write current flowing through the coil at a higher speed and to write it at the recording density of a 1 mega byte device by switching the direction of the write current at a lower speed.

Thus, the recording medium itself can be used with both the 1 mega byte device and the 4 mega byte device. Therefore, the magnetic recording apparatus including the write circuit according to the present invention is compatible with the existing magnetic recording apparatus having a lower recording density than that of the present apparatus.

The waveform correction circuit mentioned above can be realized by a trapezoidal wave generator circuit and a selector. It is possible to obtain a recording state corresponding to the 4 mega byte device by supplying the write signal binarized by the binary signal generator circuit such as a flip-flop directly to the drivers to supply a write current to the coil of the magnetic head and obtain a recording state corresponding to the 1 mega byte device by supplying the output of the binary signal generator circuit to the drivers through the trapezoidal wave generator circuit to produce a write current whose leading and trailing portions are made dull and supply the write current to the coil.

Further, it is possible to obtain the recording state of the 1 mega byte device by producing a write current whose leading and trailing portions are made dull by the fly-wheel effect of a bidirectional diode circuit inserted in parallel to the coil of the magnetic head during the recording state of the 1 mega byte device.

DETAILED DESCRIPTION OF THE PREFERRED EMBODIMENTS

Figure 1:
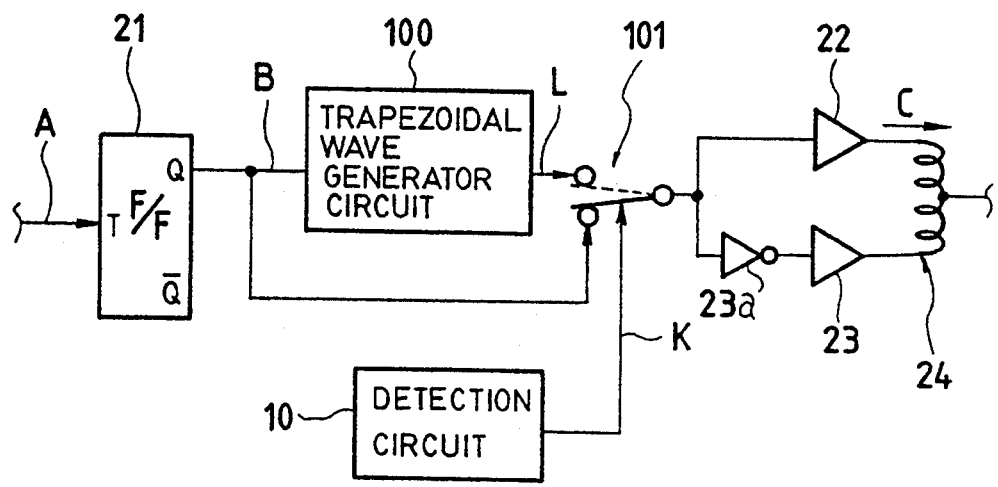
FIG. 1 is a block circuit diagram showing an embodiment of a write circuit according to the present invention.

FIG. 1 shows an embodiment of the present invention which comprises a trapezoidal waveform generator circuit 100, a selector 101 which is constituted with a switch circuit and a binary signal generator circuit responsive to a write signal A to generate a binary signal for writing data. The binary signal generator circuit is composed of a flip-flop 21, drivers 22 and 23 and a coil 24 which are the same elements as those in FIG. 5.

The trapezoidal wave generator circuit 100 and selector 101 constitute a waveform correction circuit according to the present invention, and the trapezoidal wave generator circuit may be constituted with a CR circuit, etc. The circuit 100 receives a binary signal B, "0", "1" which is a Q output of the flip-flop 21, and a capacitor of circuit 100 is charged at a timing of a switching of the binary signal from "0" to "1" to gentle the slope of the leading portion of the waveform, and discharged at a timing of a switching from "1" to "0" to gentle the slope of the trailing portion thereof, to thereby produce a current waveform corresponding to the waveform C in FIG. 4 as a trapezoidal waveform signal L.

The trapezoidal waveform signal L is supplied to the selector 101. The trapezoidal waveform signal may not be always an exact trapezoid. It is enough that the signal changes gradually. Therefore, it may be an approximated trapezoidal wave having gradually curved portions. This trapezoidal wave is not limited to those generated by charging/discharging of the CR circuit.

In this embodiment, although the trapezoidal wave signal L is generated from the signal B for simplicity of description, it may be possible to produce such a trapezoidal wave signal L directly from the write signal A.

The selector 101 is constituted with an analog switch capable of selecting one of two inputs which are the trapezoidal signal L and the Q output (the signal B) of the flip-flop 21. The signal selected thereby is supplied to the drivers 22 and 23. The driver 23 receives the selected signal not directly but indirectly through an inverter 23a. As a result, it is driven by an inverted signal with respect to the driving signal for the driver 22. Therefore, the write signal C is supplied from the drivers 22 and 23 to the coil 24. The write signal C is switched upon receipt of every pulse of write signal A. A selecting operation of the selector 101 is performed in response to a selection signal K.

In this construction, the recording state corresponds to the 4 mega byte device when the selector 101 selects the signal B according to the selection signal K as shown by a solid line in the figure. The operation in this case is the same as that of the circuit shown in FIG. 5. In this case, the recording medium is written in a manner corresponding to the 4 mega byte device and magnetized as shown by the magnetization D in FIG. 6.

On the other hand, the recording state corresponds to the 1 mega byte device when the selector 101 selects the trapezoidal wave signal L according to the selection signal K as shown by a dotted line in the figure. In this case, the operation from reception of the write signal A (waveform A in FIG. 4) to the generation of the binary signal B (waveform B in FIG. 4) is the same as that of the circuit in FIG. 5. However, the leading and trailing portions of the signal B are relaxed in slope since the signal B is supplied to the trapezoidal wave generator circuit 100. This signal is supplied to the drivers 22 and 23. As a result, the write current C changes its state from that shown by the dotted line to that shown by the solid line in the current waveform C in FIG. 4. In other words, the leading and trailing portions of the write signal C become relaxed. Therefore, change of magnetization on the magnetic recording medium becomes relaxed. Such a gentle change of the magnetized state can be made to correspond to the magnetization state in writing of a 1 mega byte device or to a change of the read waveform when it is read, by selecting a time constant of the CR circuit which determines the gradient of the trapezoidal wave of the trapezoidal wave generator circuit 100. The time constant of the CR circuit may be determined experimentally according to, for example, the characteristics of the magnetic recording apparatus.

By doing so, it is possible to write a medium for a 1 mega byte device at the 1 mega byte device density with use of a 4 mega byte device. As a result, a magnetization state substantially similar to that of the existing 1 mega byte device can be realized (see magnetization D in FIG. 4).

Figure 4:
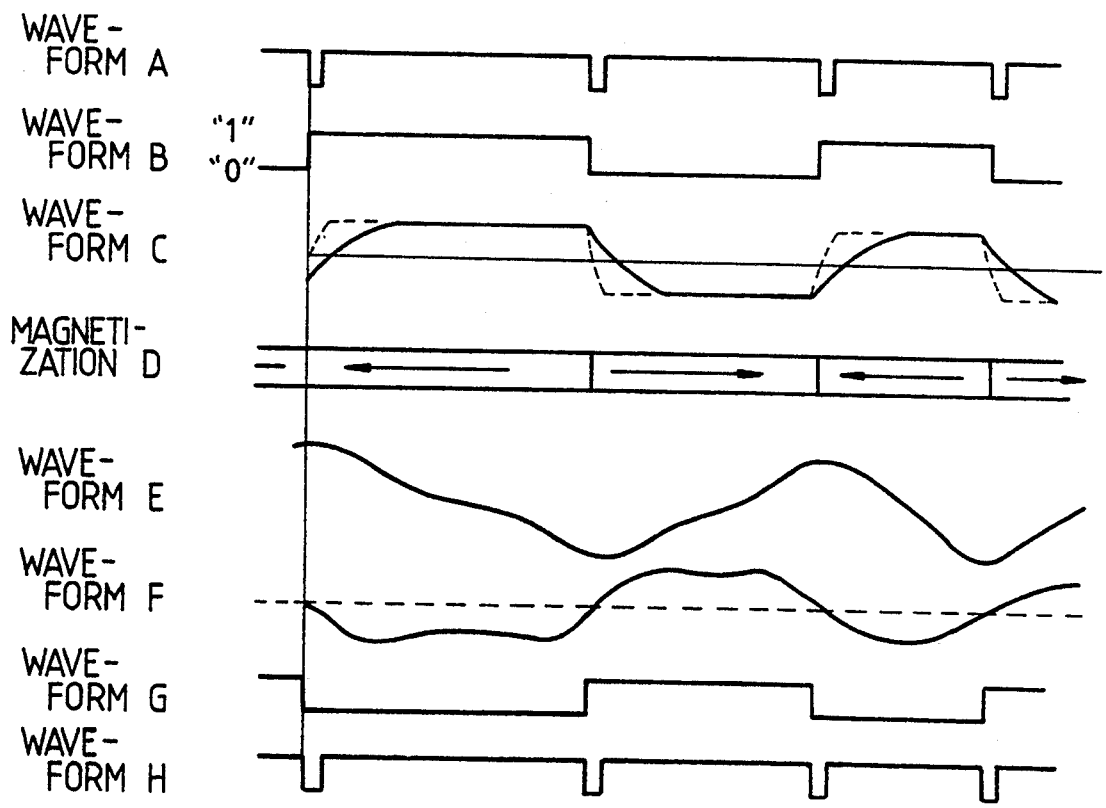
FIG. 4 shows waveforms at various portions of the write circuit shown in FIG. 1 when a data write is performed thereby at the recording density corresponding to the magnetic recording apparatus corresponding to the 1 mega byte device.

When this medium is read by the existing 1 mega byte device or by a 4 mega byte device, a gently changing read waveform similar to that when the medium written by the existing 1 mega byte device is read can be obtained (see waveforms E, F, G and H in FIG. 4).

Therefore, the 4 mega byte device using this write circuit can have substantially complete compatibility with the existing 1 mega byte device. The write format selection between the 4 mega byte device and the 1 mega byte device can be performed in the magnetic recording apparatus according to the selection signal K.

Figure 2:
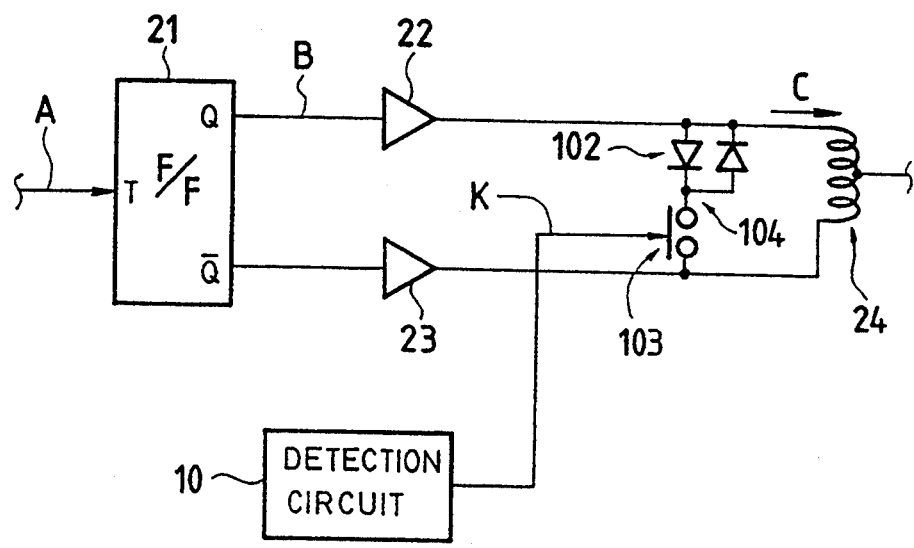
FIG. 2 is a block circuit diagram showing another embodiment of a write circuit according to the present invention.
Figure 3:
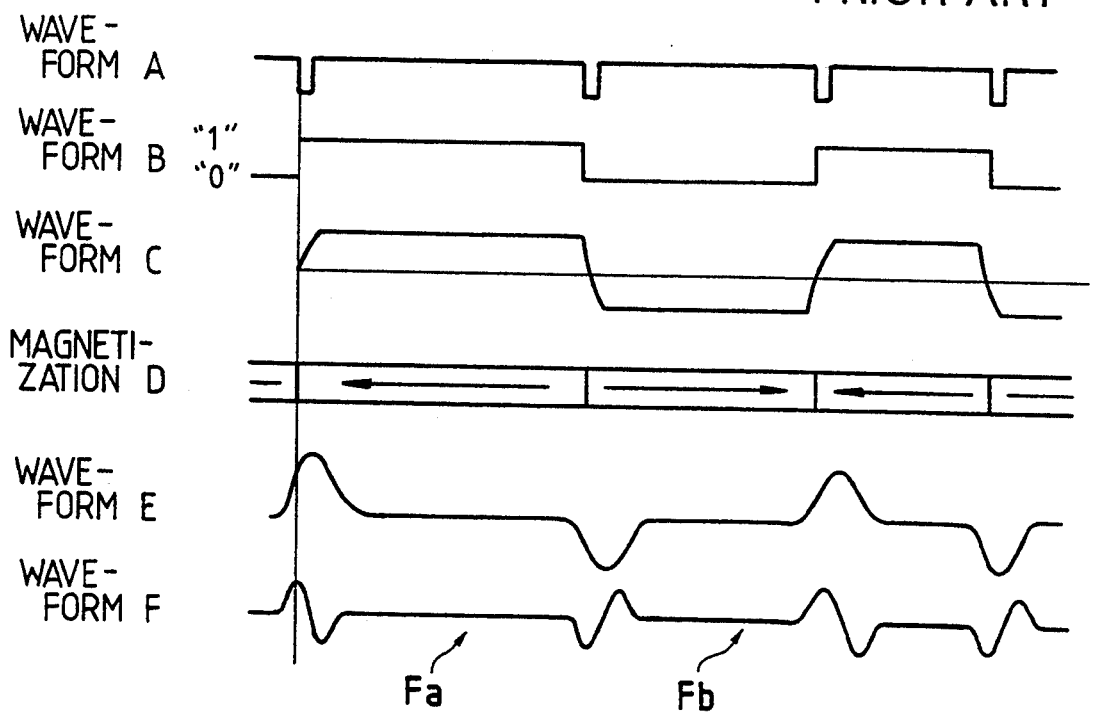
FIG. 3 shows signal waveforms at various portions of a write circuit when data are written at recording densities corresponding to a 1 mega byte device by using a write circuit of a conventional magnetic recording apparatus corresponding to a 4 mega byte device.
Figure 5:
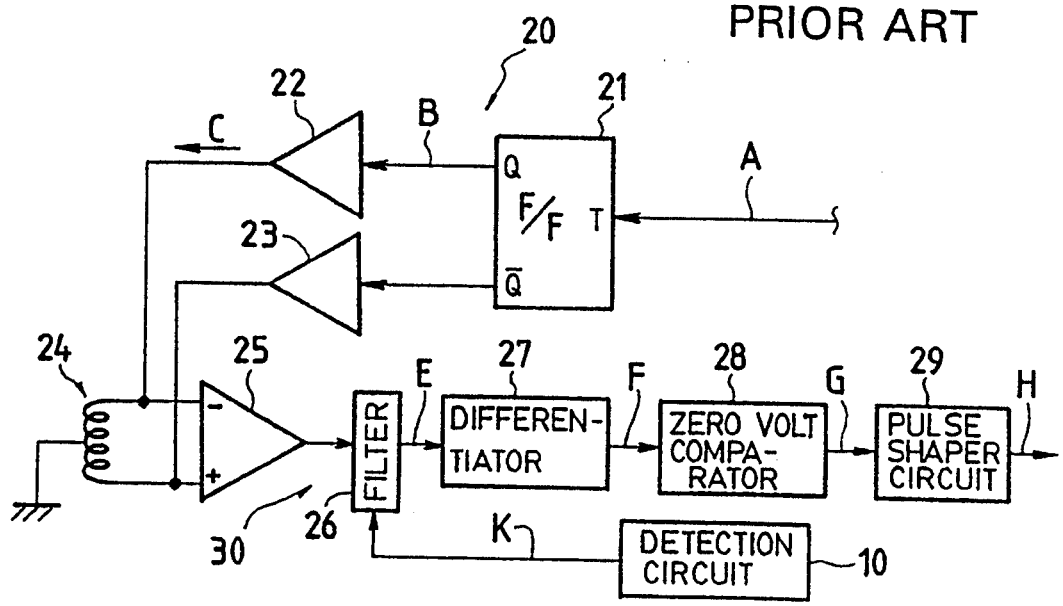
FIG. 5 is a block circuit diagram of a write circuit and a read circuit of a conventional magnetic recording apparatus corresponding to the 4 mega byte device.
Figure 6:
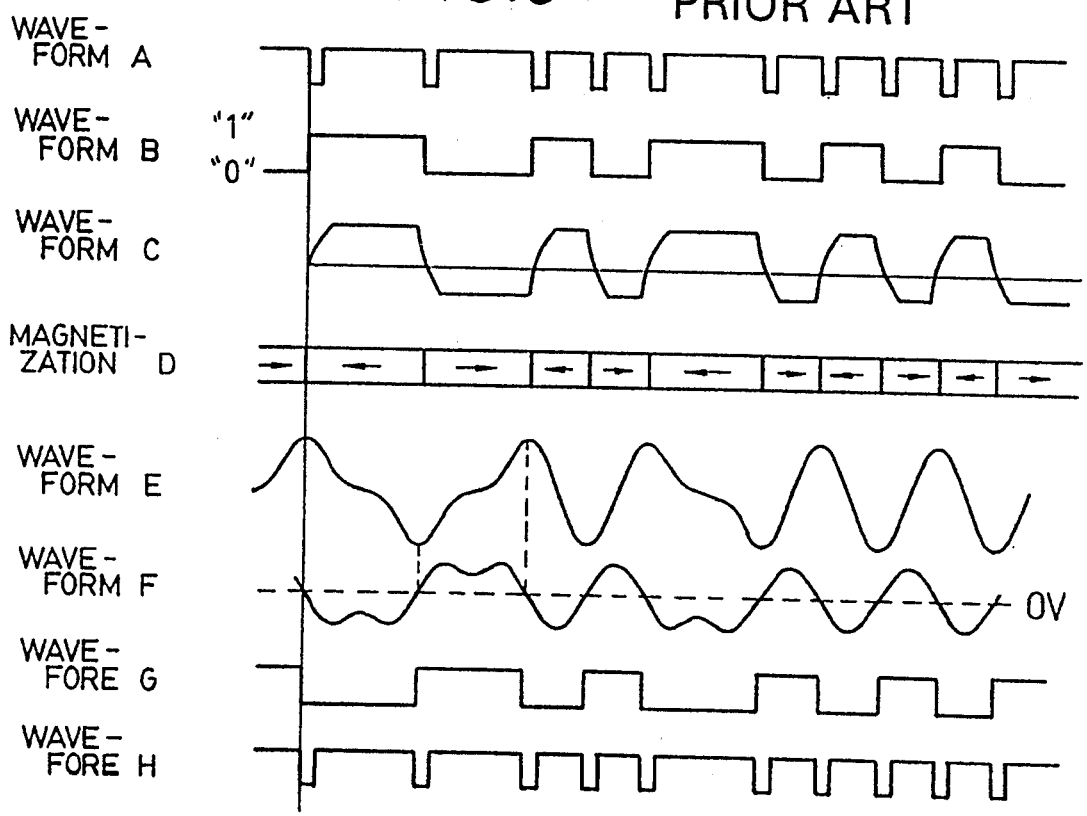
FIG. 6 shows waveforms at various portions of the write and read circuits in FIG. 5 when data are written by the write circuit and then read by the read circuit.

FIG. 2 shows another embodiment in which a waveform correction circuit is composed of a series circuit 104 including a bidirectional diode circuit 102 and a switch circuit 103. The series circuit 104 is connected in parallel to a coil 24. Other circuit construction is the same as shown in FIG. 5.

The diode circuit 102 is constituted with two diodes connected in parallel with opposite polarity. Typically, potentials at opposite ends of the coil are higher than the conduction voltage of the diode when a drive current for the coil 24 is cut off, and thereby one of the two diodes conducts for providing the so-called fly-wheel effect. The fly-wheel effect is provided when the write current C flows through the coil in any direction.

The switch circuit 103 is constituted with, for example, an analog switch, etc., which is on-off operated according to the selection signal K. Since the diode circuit 102 and the switch circuit 103 are connected in series, when the switch circuit 103 is opened by the selection signal K, the diode circuit 103 does not operate. This state is the state corresponding to the 4 mega byte device. On the other hand, when the switch circuit 103 is closed by the selection signal K, the diode circuit 102 is inserted in parallel to the coil 24. This state corresponds to the state of the 1 mega byte device. Due to the fly-wheel effect of the diode circuit 102, the write current C flowing to the coil 24 does not change sharply as in the conventional device (see solid line portion of waveform C in FIG. 4). As a result, the change of magnetization D of the medium becomes gentle.

Therefore, it is possible to write a medium for a 1 mega byte device at the 1 mega byte device density with use of a 4 mega byte device. As a result, magnetization state can be realized that is substantially similar to that of the existing 1 mega byte device (see magnetization D in FIG. 4). It will be appreciated from the foregoing that there is no problem when data are read from such medium by means of the 1 mega byte device.

Therefore, the 4 mega byte device using this write circuit shown in FIG. 2 can have substantially complete compatibility with the existing 1 mega byte device.

The connection of the series circuit of the diode and switch to the coil 24 is not limited to that shown in FIG. 2. The series circuit may be connected between one end of the coil 24 and an intermediate tap thereof. Further, it may be connected between one end of the coil 24 and a power source terminal or between the one end of the coil 14 and a ground terminal.

Contrary to the above description, the selector 101 can select between the Q output of the flip-flop 21 and an output of the trapezoidal wave generator circuit 100. In such a case, since the direction of magnetization becomes opposite to that in FIG. 1, the inverter 23a is removed and instead an inverter is inserted in the upstream side of the driver 22 or else the read signal is inverted.

The selection signal K may be generated by a CPU for controlling a memory device itself in response to a detection signal of the detection circuit 10. Further, it is possible to generate the selection signal K by manually operating an external turn-over switch.

Although the compatibility with the 1 mega byte device has been described, the present invention can be applied to any intermediate device, such a 2 mega byte device, between the 1 mega byte and 4 mega byte devices by selecting the characteristics of the bidirectional diode or the state of the trapezoidal wave from the trapezoidal wave generator. Further, it is possible to have compatibility between a plurality of devices by selecting the trapezoidal wave according to the selection signal K for the devices.

While the preferred embodiment has been set forth along with modifications and variations to show specific advantageous details of the present invention, further embodiments, modifications and variations are contemplated within the broader aspects of the present invention, all as set forth by the spirit and scope of the following claims.

What is claimed is:

1. A write circuit of a magnetic recording apparatus in which a write current flowing through a coil of a magnetic head is switched according to a write signal to magnetize a magnetic recording medium at a predetermined recording density to thereby record information, said write circuit comprising:
    a binary signal generator circuit responsive to the write signal for generating logical "0" and "1" signals;
    a drive circuit responsive to the logical signals for supplying the write current to said coil;
    a waveform correction circuit for changing the waveform of leading and trailing portions of the write current; and
    selection means for selectively removing and inserting said waveform correction circuit from and into said write circuit upon receipt of a selection signal for selecting between a recording state with the predetermined recording density and a recording density that is different than the predetermined recording density, respectively;
    wherein said binary signal generator circuit comprises a flip-flop circuit having a trigger terminal supplied with said write signal and providing one of a Q output and a $\overline{Q}$ output;
    wherein said drive circuit comprises a first driver arranged to directly receive the Q output of said flip-flop circuit and a second driver arranged to receive the Q output of the flip-flop circuit, and said waveform correction circuit comprises a series circuit of a bidirectional diode circuit and a switch circuit, said series circuit being connected in parallel to said coil, said switch circuit being closed upon receipt of said selection signal to insert said waveform correction circuit in circuit.

2. The write circuit claimed in claim 1, wherein the predetermined recording density and the different recording density are each greater than or equal to 1 mega byte per magnetic recording medium.

3. The write circuit claimed in claim 1, wherein said selection means selectively inserts said waveform correction circuit between said coil and said drive circuit.

4. The write circuit claimed in claim 1, wherein said drive circuit together with said waveform correction circuit changes the transition slope of the binary signal between the logical "0" and "1" signals when said waveform correction circuit has been inserted by said selection means as compared to the transition slope of the binary signal when said waveform correction circuit is not in circuit.

5. A magnetic recording apparatus including a write circuit for switching a direction of a write current flowing through a coil of a magnetic head according to a write signal to magnetize a magnetic recording medium at a predetermined recording density to thereby record information, said magnetic recording apparatus comprising:
    a detection circuit for detecting a recording medium for a magnetic recording apparatus for magnetically recording information at a recording density different from said predetermined recording density; and
    said write circuit comprising:
        a binary signal generator circuit responsive to the write signal for generating logical "0" and "1" signals;
        a drive circuit responsive to the logical signals for supplying the write current to said coil;
        a waveform correction circuit for changing the waveform of leading and trailing portions of the write current; and
        selection means for selectively inserting and removing said waveform correction circuit into and from said write circuit upon receipt of a selection signal for selecting between a recording state with said different recording density and the predetermined recording density, respectively;
    wherein said binary signal generator circuit comprises a flip-flop circuit having a trigger terminal supplied with said write signal, and said drive circuit comprises a first driver arranged to directly receive a Q output of said flip-flop circuit and a second driver arranged to receive a Q output of the flip-flop circuit, and said waveform correction circuit comprises a series circuit of a bidirectional diode circuit and a switch circuit, said series circuit being connected in parallel to said coil, said switch circuit being closed upon receipt of said selection signal to insert said waveform correction circuit in circuit.

6. The write circuit claimed in claim 5, wherein said selection means selectively inserts said waveform correction circuit between said coil and said drive circuit.

7. The write circuit claimed in claim 5, wherein said drive circuit together with said waveform correction circuit changes the transition slope of the binary signal between the logical "0" and "1" signals when said waveform correction circuit has been inserted by said selection means as compared to the transition slope of the binary signal when said waveform correction circuit is not in circuit.

* * * * *